United States Patent
Finney

(10) Patent No.: US 11,375,684 B1
(45) Date of Patent: Jul. 5, 2022

(54) LITTER BOX SYSTEM AND METHODS

(71) Applicant: Bradley J. Finney, Rancho Santa Margarita, CA (US)

(72) Inventor: Bradley J. Finney, Rancho Santa Margarita, CA (US)

( * ) Notice: Subject to any disclaimer, the term of this patent is extended or adjusted under 35 U.S.C. 154(b) by 485 days.

(21) Appl. No.: 16/283,264

(22) Filed: Feb. 22, 2019

(51) Int. Cl.
*A01K 1/01* (2006.01)

(52) U.S. Cl.
CPC .................................. *A01K 1/0107* (2013.01)

(58) Field of Classification Search
CPC ...... A01K 1/0107; A01K 1/035; A01K 1/011; A01K 1/0114
See application file for complete search history.

(56) References Cited

U.S. PATENT DOCUMENTS

| | | | |
|---|---|---|---|
| 2,306,014 A * | 12/1942 | Carson | A01K 1/0107 119/161 |
| 2,741,223 A * | 4/1956 | Winborn, Jr. | A01K 1/0107 119/165 |
| 3,310,031 A * | 3/1967 | Lowe, Jr. | A01K 1/0107 119/165 |
| 3,822,671 A | 7/1974 | Rosenberg | |
| 3,990,396 A * | 11/1976 | Turk | A01K 1/0107 119/170 |
| 4,111,157 A | 9/1978 | Haugen | |
| D250,051 S | 10/1978 | Spinks | |
| 4,271,544 A * | 6/1981 | Hammond | A01K 1/0107 119/165 |
| 4,649,578 A | 3/1987 | Vargo | |
| 5,044,325 A | 9/1991 | Miksitz | |
| 5,099,794 A | 3/1992 | Pearce, Jr. | |
| 5,129,364 A | 7/1992 | Pirkle | |
| 5,392,733 A * | 2/1995 | Tominaga | A01K 1/0107 119/165 |
| 5,454,349 A | 10/1995 | Bondurant, III | |
| 5,615,638 A | 4/1997 | Thornton | |
| 5,713,302 A | 2/1998 | Walter | |
| 5,806,461 A * | 9/1998 | Kiera | A01K 1/0107 119/165 |
| D433,544 S | 11/2000 | Nesbit-Yontz | |
| 6,295,948 B1 | 10/2001 | Bowron | |
| 6,761,130 B1 | 7/2004 | Vicknair | |
| 7,017,519 B1 | 3/2006 | Deasy | |
| 7,051,678 B2 | 5/2006 | Strickland | |
| D533,974 S * | 12/2006 | Hirokawa | D30/161 |
| 8,256,380 B2 | 9/2012 | Bjomson | |
| 2002/0000205 A1* | 1/2002 | Yamamoto | A01K 1/0114 119/161 |
| 2005/0172907 A1 | 8/2005 | Sharpe | |
| 2005/0263089 A1* | 12/2005 | Hirokawa | A01K 1/0107 119/165 |
| 2006/0042551 A1* | 3/2006 | Moran | A01K 1/0107 119/166 |

(Continued)

*Primary Examiner* — Tien Q Dinh
*Assistant Examiner* — Katelyn T Truong
(74) *Attorney, Agent, or Firm* — Stout, Uxa & Buyan, LLP; Donald E. Stout

(57) ABSTRACT

An animal litter box includes at least two separate parts. The main part is the tray which holds the litter, and the secondary part is the hood, or cover, the area in which the animal stands. The hood or cover may clip or clamp onto the tray. Because of the construction of the hood, or cover, the available surface area for the pet to stand in is substantially less than the total surface area of the tray.

19 Claims, 2 Drawing Sheets

(56) References Cited

U.S. PATENT DOCUMENTS

| | | |
|---|---|---|
| 2006/0102092 A1 | 5/2006 | Cortez |
| 2007/0175400 A1 | 8/2007 | Gantt |
| 2010/0307424 A1 | 12/2010 | Evans |
| 2011/0067639 A1 | 3/2011 | Bauer |
| 2011/0100301 A1 | 5/2011 | Trussardi |
| 2015/0122189 A1* | 5/2015 | Sweetman ........... A01K 1/0107 119/165 |
| 2016/0021844 A1 | 1/2016 | Peterson |
| 2019/0246597 A1* | 8/2019 | Randall .................. A01K 1/011 |
| 2019/0274273 A1* | 9/2019 | Munson ............... A01K 1/0114 |

* cited by examiner

LITTER BOX SYSTEM AND METHODS

BACKGROUND OF THE INVENTION

The present invention relates generally to devices, systems and methods for pet waste disposal. More specifically, the present invention relates to a litter box which has a covering for directing pets to use the center of the box instead of the sides.

The cat box, or litter box, is a necessary, although often unpleasant, aspect of owning a pet cat. Having the box involves a certain amount of space, mess, and odor. Cleaning the box involves time, effort, more odor and unpleasant close involvement with pet waste. This unpleasantness has inspired many inventions of varying success. The prior inventions have aimed at: 1) making the box automated to reduce human involvement, 2) making the box less smelly, or 3) making the box simpler to clean to reduce time, effort and mess. One prior system comprises a hood placed over the pet litter box to make it into a semi-enclosed area (with or without a door). This provides certain benefits. One such benefit is that cats like privacy, and are more disposed to use a box that feels more private rather than seeking out other private areas in the house. Another benefit is that the smell of the box is somewhat contained within the enclosure, rather than being communicated throughout the room. Additionally, a charcoal filter may be inserted into the top of the hood to trap odors.

Another prior inventive system is clumping pet litter. This feature allows the cleaner of the box to remove an entire urination with a single scoop. The clump stays together, generally, getting all of the mess in one try and unattached litter (still clean) sifts back into the box, thereby reducing litter waste.

Clumping litter does a very good job of making urinations easy to completely remove without wasting excess litter. It is very popular, and there are now essentially no litter products on the market that do not clump. Even with clumping litter, however, a box must periodically be completely emptied and cleaned in order to maintain the health of the pet and the cleanliness of the box. The clumping litter greatly increases the interval between these complete cleanings by effecting the removal of nearly 100% of the urine simply by scooping the litter clumps out of the box. However, clumping litter only clumps as intended when the urine is in the center of the litter box. When the animal urinates along the side of the litter box, the litter tends to become attached to the wall of the box. This is problematic for a couple of reasons. First, the clump is physically difficult to dislodge in order to scoop it out. A clump not touching a side or corner can easily be maneuvered into the sifting scoop by moving the scoop under the clump and lifting it up. A side-to-side sifting motion is then used to separate the clump from the loose litter, leaving the clump in the scoop for disposal. A clump touching a side or corner must first be dislodged from the side by using the scoop like a knife or shovel and pushing down between the side and the clump. This process always leaves at least some of the urine (in a sort of muddy state mixed with the litter) affixed to the side wall of the box. Once dislodged from the side, the clump may be scooped, but it is difficult to get the scoop all the way under the clump because it is still adjacent to the side. The scoop hits the side wall before getting fully under the clump which makes the clump harder to remove in its entirety. The clump ends up hanging off of the front edge of the scoop and likely breaking into parts.

Second, when adjacent to the side or corner, the urine does not come into contact with enough litter to be properly absorbed and making a proper, firm clump. A urination in the middle of the box comes into contact with litter on all sides and forms a roughly egg-shaped clump that is quite sturdy and seems dry. A urination adjacent to a side or corner, on the other hand, forms a flattened egg shape that does not get to the same level of dryness and sturdiness as does the one from the center of the box. This is due to the fact that it has come into contact with less litter, and less drying and hardening is effected. So, in addition to the physical challenges of removing this clump, there is the additional challenge of keeping it in one piece during removal. The less-sturdy clump tends to break up during removal, leaving small fragments of the clump in the box, that require more scooping attempts to remove. Additionally, many of the small clumps are small enough to fit through the sifting slots in the scoop, making their removal effectively impossible. This results in urine remaining in the box even after an attempted cleaning. This remaining urine is undesirable—cats use the box more reluctantly when it is more odorous, thereby increasing the possibility that the cat will relieve itself elsewhere in the house. Additionally, the owner must live with a more odorous cat box, and the owner must perform a "full cleaning" far more frequently. These "full cleanings" are unpleasant in that they waste litter and require significant time and effort and close handling of the box. These full cleanings are sufficiently unpleasant as to have engendered numerous attempts at disposable litter box systems.

SUMMARY OF THE INVENTION

It is an object of this invention to eliminate the inconvenience of cleaning litter clumps on the sides of a pet litter box, and to ensure that the pet uses the litter box close to the center in order for the litter to clump as intended.

The invention is a multi-component litter box comprising at least two separate parts. The main part is the tray which holds the litter, and the secondary part is the hood, the area in which the animal stands. The hood may clip or clamp onto the tray. Because of the construction of the hood, or cover, the available surface area for the pet to stand in is substantially less than the total surface area of the tray.

In using the litter box, the pet enters through the opening of the hood, and then is constrained to the center of the litter box by the walls of the hood.

More particularly, in one aspect of the invention, there is provided an animal litter box which comprises a tray section comprising opposed side walls, opposed end walls, and a floor joining the side walls and end walls, the side walls and end walls forming a perimeter defining an interior volume for containing material to manage animal refuse. The litter box further comprises a cover section having a base portion forming an outer perimeter of the cover section, edges of the base portion being disposed atop the side and end walls of the tray section, an opening disposed in a center region of the base portion, and extending entirely through the base portion, the cover section further comprising opposed upstanding side walls disposed along edges of the base portion opening, wherein the base portion opening is substantially smaller than an area defined by the tray section side walls and end walls, the opposing upstanding side walls being substantially equal in length to adjacent edges of the base portion opening, the base portion opening providing access for entry through the base portion and directly in to the interior volume of the tray section for a pet seeking to relieve itself, a length of each of the opposed side walls of the cover section being less than a length of each of the opposed side walls of the tray section, the base portion of the cover section surrounding the base portion opening, the base portion extending across and being disposed above the interior volume and covering a portion of the interior volume, the cover section further comprising a vertical flange extending downwardly from the base portion, the vertical flange surrounding the base portion opening.

The base portion is attachable to and separable from the tray section. The base portion comprises a planar cover which is attachable to the side walls and end walls of the tray section and extends inwardly across a width of the tray section to cover an outer perimeter of the interior volume, defining the center opening, such that the center opening provides the only direct access to a center portion of the interior volume, the planar cover covering all other portions of the interior volume.

The planar cover is removably secured to the tray portion using mechanical fasteners, which may preferably include clips, hook and loop fasteners, magnets, or snaps.

In one embodiment of the invention, the cover section comprises a hood portion having opposed upstanding side walls, a roof portion, and opposed end openings for access into the hood portion by an animal. The area disposed beneath the hood portion is substantially smaller than an area defined by the tray section side walls and end walls. The second portion comprises a perimeter lip comprised, in part, by the opposed upstanding side walls, the perimeter lip defining and surrounding the opening. The interior volume of the tray section contains litter material, the litter material directly contacting the floor of the tray section.

Advantageously, in order to ensure that the animal is located sufficiently toward the center portion of the litter box to achieve the desired results identified in this application, the outer perimeter of the cover section has a width of between approximately 1 and 4 inches. More preferably, the cover section outer perimeter width is between approximately 2 and 3 inches. The vertical flange extends downwardly at least ¼ inch, and in one exemplary embodiment that downward extension is about ½ inch. In one exemplary embodiment, the vertical flange comprises a downwardly directed extension of the perimeter flange.

In another aspect of the invention, there is provided an animal litter box which comprises a tray section having opposed side walls, opposed end walls, and a floor joining the side walls and end walls, the side walls and end walls forming a perimeter defining an interior volume for containing material to manage animal refuse. A cover section comprises a base portion forming an outer perimeter of the cover section, edges of the base portion being disposed atop the side and end walls of the tray section and the base portion comprising an opening disposed in a center region of the base portion. A planar surface entirely surrounds the opening, the opening extending entirely through the planar surface and the planar surface being disposed above and extending across the interior volume of the tray section to cover a portion of the interior volume. The cover section further comprises opposed upstanding side walls disposed along a length of the opening on opposed sides of the opening, so that a distance between the opposed upstanding side walls is equal to a width of the opening, the base portion opening providing access for entry into a center portion of the interior volume of the tray section for a pet seeking to relieve itself. Advantageously, the cover section further comprises a vertical flange extending downwardly from the base portion, the vertical flange surrounding the base portion opening.

In one exemplary embodiment, the opposed upstanding side walls comprise a hood portion, the hood portion further comprising a roof portion supported by the opposed upstanding side walls, the hood portion covering and surrounding the base portion opening.

In exemplary embodiments, the base portion opening is the only opening into the tray section interior volume, such that entry into the tray section interior volume can only be achieved by entry first into the hood portion. The interior volume of the tray section contains litter material, the litter material directly contacting the floor of the tray section. The outer perimeter of the cover section has a width of between approximately 1 and 4 inches, and in exemplary embodiments the cover section outer perimeter width is between approximately 2 and 3 inches.

The invention, together with additional features and advantages thereof, may best be understood by reference to the following description taken in conjunction with the accompanying illustrative drawing.

DETAILED DESCRIPTION OF THE INVENTION

Figure 1:
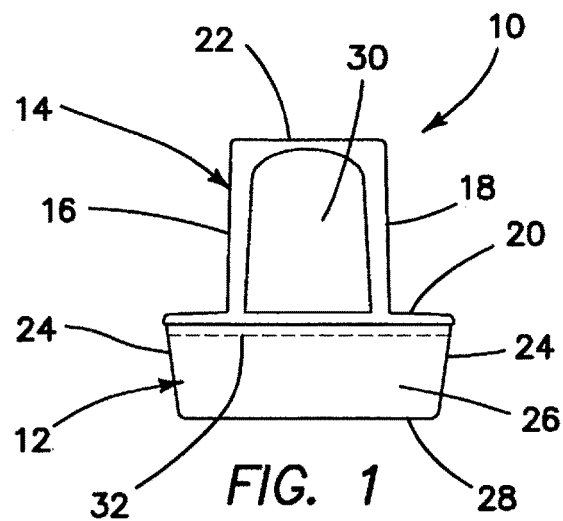
FIG. 1 is a front view of one embodiment of a litter box system constructed in accordance with the principles of the present invention.
Figure 2:
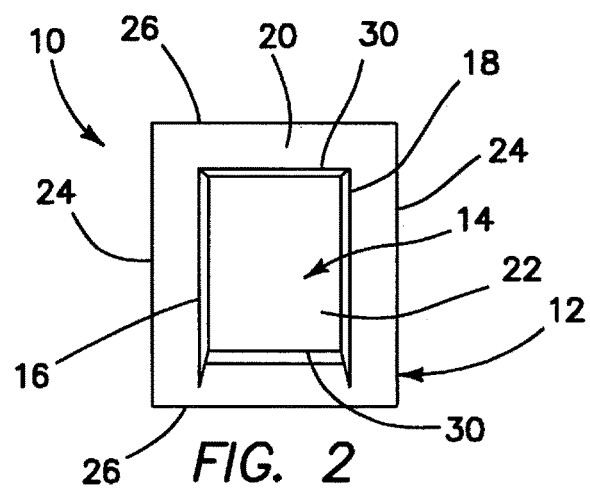
FIG. 2 is a top view of the litter box of FIG. 1.
Figure 3:
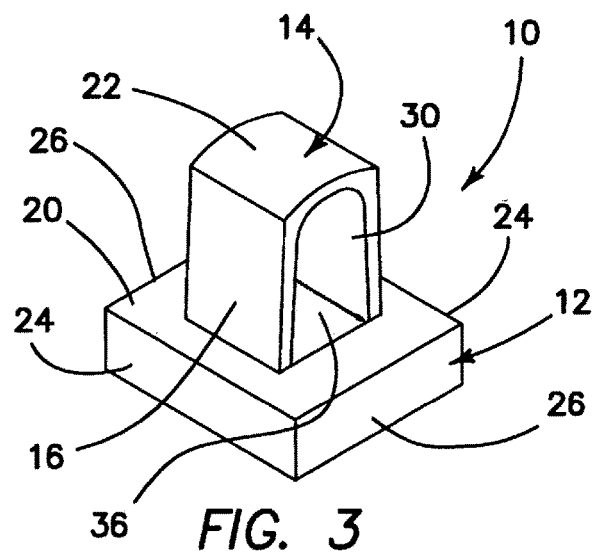
FIG. 3 is an orthogonal view of the embodiment of FIGS. 1 and 2.

Referring now more particularly to the drawings, an embodiment of a litter box 10 for facilitating clean-up of pet waste is illustrated in FIGS. 1-3. The litter box 10 is constructed of a tray section 12, to which a cover section 14 is attached.

An important aspect of the invention is the particular construction of the cover section 14, which forces the pet to relieve itself in the center portion of the tray section 12. More particularly, the cover section 14 includes a hood portion comprising opposed side walls 16, 18 upstanding from a base portion 20 and joined by a roof portion 22. The tray section 12 is formed of two opposed side walls 24 which are joined by two opposed end walls 26 and a tray floor 28. The tray section is open at its top, and its interior volume is adapted for containing a supply of litter material, such as sand or special purpose litter. The cover section 14 is physically securable to the tray section 12, by plastic or metal clips, hook and loop fasteners, magnets, snaps, or other suitable means for removably securing one structure to another. The base portion 20 of the cover section 14 comprises a cover or closure for a portion of the tray section 12, as shown in the drawing figures. As assembled, the cover section 14 comprises opposed end openings 30 through which the animal may enter and exit the litter box 10 through an opening 36 in the base portion 20 (FIG. 3). FIG. 3 is an orthogonal view of the assembled litter box 10, from either end of the box.

As shown in the drawings, the length and width of the accessible area under the hood portion of the cover section 14, bounded by the opposed end openings 30 and the cover section side walls 16, are respectively substantially less than the length and width of the tray portion 12. Therefore, when entering the litter box, the animal must stand within the hooded area of the litter box, and thus away from the edges of the tray section 12. This feature keeps the pet away from the edges and corners of the box, and thus forces the pet to relieve itself in the middle of the box. This, in turn, allows clumping litter, if used, to be at its maximum effectiveness, resulting in a litter box that is easier to clean and needs a fully cleaning far less often.

Referring again to FIG. 1, a dashed line 32 represents a level of litter contained within the tray section 12. Enough litter is contained within the tray so that when the pet urinates, the resulting clump does not reach all of the way to the bottom of the tray. This makes the clump easy to remove. The litter level forms the effective floor level of the box once the pet is inside. So, even though the tray is relatively deep, the pet is constrained to the area covered by the hood because the litter level makes an effective floor that is near the bottom edge of the cover section. Of course, the base portion 20 of the cover section 14 is also largely responsible for confining the pet to the area of the litter box which is under the hood.

Figure 4:
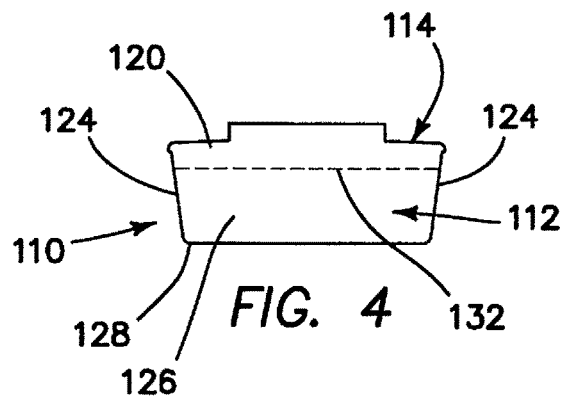
FIG. 4 is a front view of an alternative embodiment of the present invention.
Figure 5:
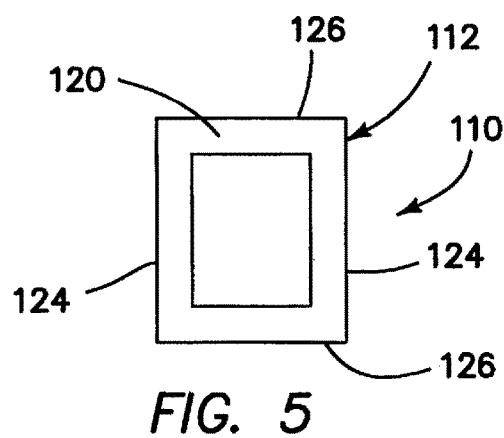
FIG. 5 is a top view of the embodiment of FIG. 4.
Figure 6:
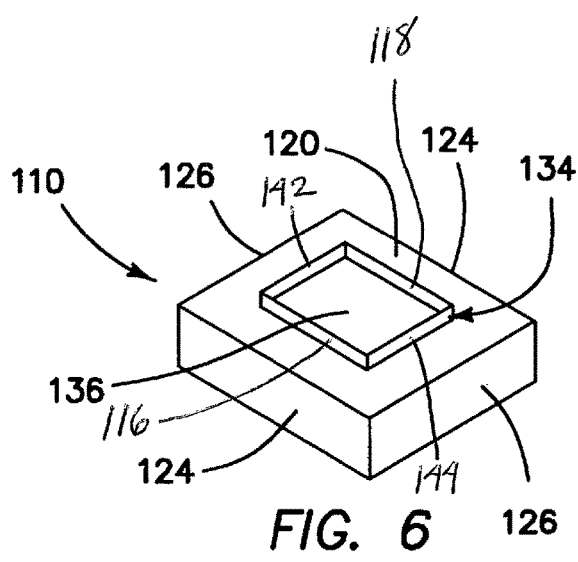
FIG. 6 is an orthogonal view of the embodiment of FIGS. 4 and 5.

Now with reference to FIGS. 4-6, an alternative embodiment 110 of the litter box is illustrated. In this embodiment like elements to those in the embodiment of FIGS. 1-3 are designated by like reference numerals, preceded by the numeral 1. In this embodiment, the tray section 112 is similar to or identical to the tray section 12 of the embodiment 10, but the cover section 114 is structurally different. In particular, the cover section 114 comprises a base portion 120, which is similar to the base portion 20 in the FIGS. 1-3 embodiment, but rather than the hood portion, comprising side walls 16, 18, roof 22, and end openings 30, the cover section 114 comprises a perimeter lip 134, having opposed side walls 116, 118, joined by opposed end walls 142, 144. The perimeter lip 134 is surrounded by the base portion 120, and defines a pet opening 136. In this embodiment, the pet enters the litter box 110 by stepping over the tray walls 124, 126 and the perimeter lip 134, and stepping into the box through the pet opening 136. The advantages of this embodiment are similar to those achieved in the prior embodiment, except for those which specifically pertain to the use of a hood, such as privacy for the pet and the potential ability to use a filter to minimize odor.

In both embodiments, the base portion 20, 120 has a dimension, between the outer perimeter of the cover section 14, 114 and the outer perimeter of the opening, 36, 136, which dimension is defined as the "width" of the base portion for the purposes of this application, of between approximately 1 and 4 inches, and preferably between about 2 and 3 inches, on all four sides of the litter box for optimized effectiveness of the inventive system.

Figure 7:
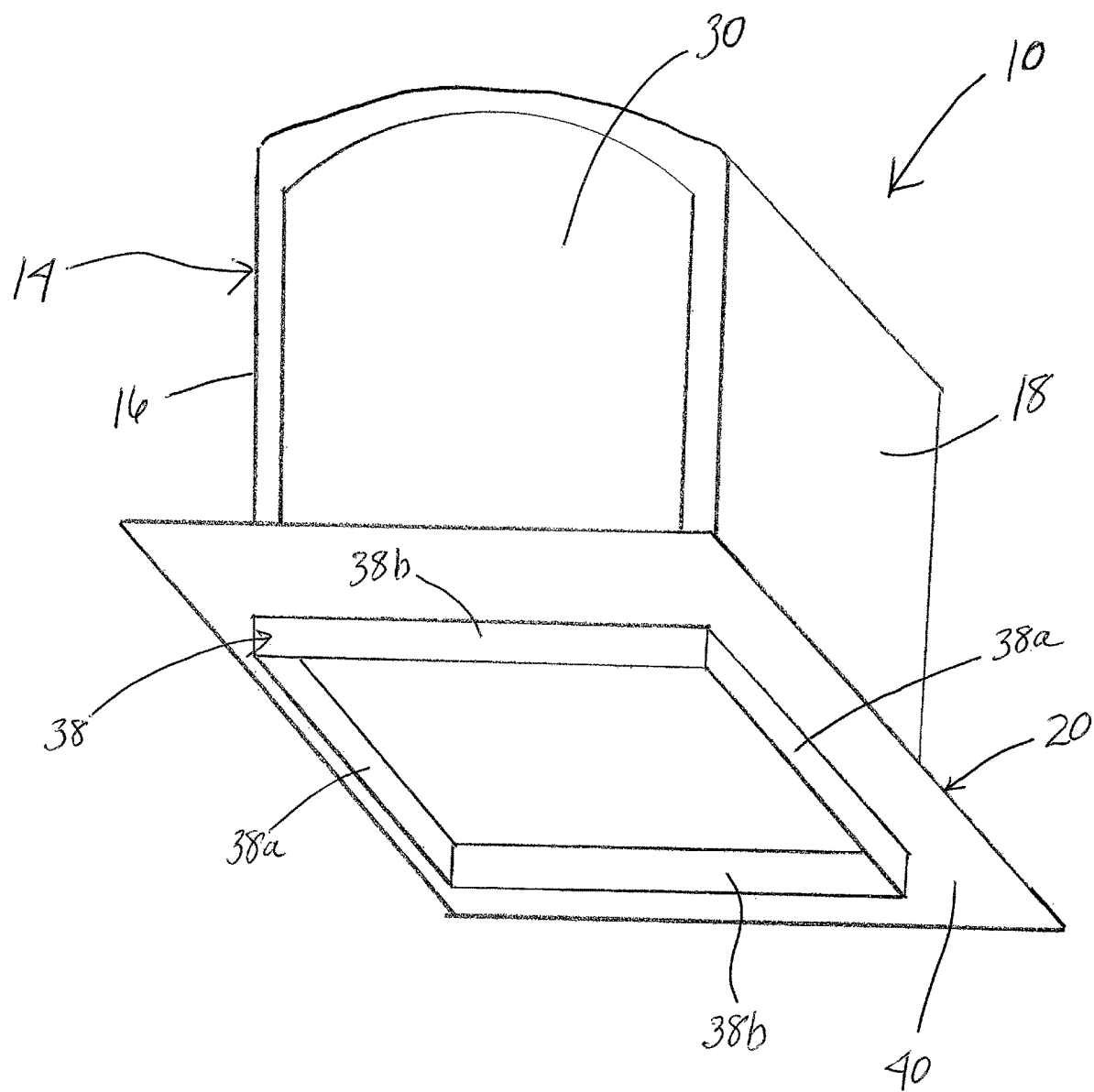
FIG. 7 is an orthogonal view showing the bottom of the cover section of the embodiment of FIGS. 1-3.

FIG. 7 illustrates a particularly innovative aspect of the inventive system, which comprises a vertical or lower flange 38 descending from a lower surface 40 of the base portion 20. The vertical flange 38 is polygonal in shape, comprising opposing side walls 38a joined by opposing end walls 38b.

An important purpose of the vertical or lower flange 38 is to prevent liquid waste, which may be excreted onto the inner surfaces of the walls 16, 18 of the cover section 14, from running along the lower surface 40 of the base portion 20, due to cohesion. The lower flange 38 thus functions to re-direct any such liquid waste downwardly into the center portion of the tray section 12 so that clumping of the litter in the tray section does not occur along the edges thereof. The flange 38 should be sized to define or outline the opening 36, and should have a depth (downward extension) of at least about ¼ inch, and preferably about ½ inch, in order to effectively channel the liquid waste into the center region of the tray.

The same kind of vertical or lower flange may be employed, as well, in the embodiment of FIGS. 4-6, which essentially comprises a downward extension of perimeter lip 134 beneath the lower surface of the base portion 120.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An animal litter box comprising:
a tray section comprising opposed side walls, opposed end walls, and a floor joining the side walls and end walls, the side walls and end walls forming a perimeter defining an interior volume for containing material to manage animal refuse;
a cover section comprising a base portion forming an outer perimeter of the cover section, edges of the base portion being disposed atop the side walls and the end walls of the tray section, a base portion opening disposed in a center region of the base portion, and extending entirely through the base portion, the cover section further comprising opposed upstanding side walls disposed along edges of the base portion opening, wherein the base portion opening is substantially smaller than an area defined by the side walls and end walls of the tray section, the opposed upstanding side walls of the cover section being substantially equal in length to adjacent edges of the base portion opening, the base portion opening providing access for entry through the base portion and directly into the interior volume of the tray section for a pet seeking to relieve itself, a length of each of the opposed side walls of the cover section being less than a length of each of the opposed side walls of the tray section, the base portion of the cover section surrounding the base portion opening, the base portion extending across and being disposed above the interior volume and covering a portion of the interior volume, the cover section further comprising a vertical flange extending downwardly from the base portion, the vertical flange surrounding the base portion opening;
wherein the base portion comprises a planar cover which extends horizontally inwardly across a width of the tray section to cover an outer perimeter of the interior volume, the planar cover being disposed orthogonally to the side walls and end walls of the tray section, the base portion opening providing the only direct access to a center portion of the interior volume, the planar cover covering all other portions of the interior volume, the planar cover extending entirely around the base portion opening and providing a horizontally disposed surface on and over which an animal may enter the base portion opening from any side or end of the animal litter box.

2. The animal litter box as recited in claim 1, wherein the base portion is attachable to and separable from the tray section.

3. The animal litter box as recited in claim 1, wherein the planar cover is removably secured to the tray section using mechanical fasteners.

4. The animal litter box as recited in claim 3, wherein the mechanical fasteners comprise clips, hook and loop fasteners, magnets, or snaps.

5. The animal litter box as recited in claim 1, wherein the cover section comprises a hood portion having said opposed upstanding side walls, a roof portion, and opposed end openings for access into the hood portion by an animal.

6. The animal litter box as recited in claim 5, wherein an area disposed beneath said hood portion is substantially smaller than an area defined by the side walls and end walls of the tray section.

7. The animal litter box as recited in claim 1, wherein the base portion comprises a perimeter lip comprised in part by the opposed upstanding side walls, the perimeter lip defining and surrounding said base portion opening.

8. The animal litter box as recited in claim 1, wherein the interior volume of said tray section contains litter material, the litter material directly contacting the floor of the tray section.

9. The animal litter box as recited in claim 1, wherein the outer perimeter of the cover section has a width of between approximately 1 and 4 inches, the width of the outer perimeter of the cover section being defined as a distance between the outer perimeter of the cover section and an outer perimeter of the base portion opening.

10. The animal litter box as recited in claim 9, wherein the cover section outer perimeter width is between approximately 2 and 3 inches.

11. The animal litter box as recited in claim 1, wherein the vertical flange extends downwardly at least ¼ inch.

12. The animal litter box as recited in claim 11, wherein the vertical flange extends downwardly about ½ inch.

13. The animal litter box as recited in claim 7, wherein the vertical flange comprises a downwardly directed extension of the perimeter lip.

14. An animal litter box comprising:
   a tray section comprising opposed side walls, opposed end walls, and a floor joining the side walls and end walls, the side walls and end walls forming a perimeter defining an interior volume for containing material to manage animal refuse; and
   a cover section comprising a base portion forming an outer perimeter of the cover section, edges of the base portion being disposed atop the side and end walls of the tray section and the base portion comprising a base portion opening disposed in a center region of the base portion and a planar horizontally disposed surface entirely surrounding the base portion opening, the base portion opening extending entirely through the planar horizontally disposed surface and the planar horizontally disposed surface being disposed above and extending across the interior volume of the tray section to cover a portion of the interior volume, the cover section further comprising opposed upstanding side walls disposed along a length of the base portion opening on opposed sides of the base portion opening, so that a distance between the opposed upstanding side walls is equal to a width of the base portion opening, the base portion opening providing access for entry into a center portion of the interior volume of the tray section for a pet seeking to relieve itself, the planar horizontally disposed surface extending entirely around the base portion opening and providing a surface on and over which an animal may enter the base portion opening from any side or end of the animal litter box;
   the cover section further comprising a vertical flange extending downwardly from the base portion, the vertical flange surrounding the base portion opening.

15. The animal litter box as recited in claim 14, wherein the opposed upstanding side walls comprise a hood portion, the hood portion further comprising a roof portion supported by the opposed upstanding side walls, the roof portion covering the base portion opening.

16. The animal litter box as recited in claim 15, wherein the base portion opening is the only opening into the tray section interior volume, such that entry into the tray section interior volume can only be achieved by entry first into the hood portion.

17. The animal litter box as recited in claim 14, wherein the interior volume of the tray section contains litter material, the litter material directly contacting the floor of the tray section.

18. The animal litter box as recited in claim 14, wherein the outer perimeter of the cover section has a width of between approximately 1 and 4 inches, the width of the outer perimeter of the cover section being defined as a distance between the outer perimeter of the cover section and an outer perimeter of the base portion opening.

19. The animal litter box as recited in claim 18, wherein the cover section outer perimeter width is between approximately 2 and 3 inches.

\* \* \* \* \*